United States Patent [19]
LeConey et al.

[11] Patent Number: 6,083,303
[45] Date of Patent: Jul. 4, 2000

[54] SNAP ON DESICCANT BAG

[75] Inventors: Douglas E. LeConey, Clayton; Raymond B. Wood, Brookville, both of Ohio

[73] Assignee: Stanhope Products Company, Brookville, Ohio

[21] Appl. No.: 09/013,397

[22] Filed: Jan. 26, 1998

Related U.S. Application Data

[63] Continuation-in-part of application No. 08/956,217, Oct. 22, 1997, Pat. No. 5,914,456, which is a continuation of application No. 08/633,434, Apr. 17, 1996, Pat. No. 5,837,039.
[60] Provisional application No. 60/069,630, Dec. 15, 1997.

[51] Int. Cl.[7] .......................... B01D 53/04; B01D 53/26
[52] U.S. Cl. ..................... 96/121; 96/135; 96/147; 55/507; 55/515; 62/476; 62/503
[58] Field of Search ............... 55/505, 507, 515; 62/474, 476, 503; 96/108, 121, 133–135, 147, 153; 210/282, DIG. 6

[56] References Cited

U.S. PATENT DOCUMENTS

| | | | |
|---|---|---|---|
| 3,879,292 | 4/1975 | McClive | 210/282 |
| 4,116,649 | 9/1978 | Cullen et al. | 55/387 |
| 4,291,548 | 9/1981 | Livesay | 62/503 |
| 4,401,447 | 8/1983 | Huber | 55/387 |
| 4,405,347 | 9/1983 | Cullen et al. | 55/387 |
| 4,436,623 | 3/1984 | Cullen et al. | 210/282 |
| 4,457,843 | 7/1984 | Cullen et al. | 210/282 |
| 4,464,261 | 8/1984 | Cullen et al. | 210/282 |
| 4,474,035 | 10/1984 | Amin et al. | 62/503 |
| 4,496,378 | 1/1985 | Kish | 55/316 |
| 4,619,673 | 10/1986 | Cullen et al. | 55/387 |
| 4,911,739 | 3/1990 | Cullen et al. | 55/387 |
| 4,921,512 | 5/1990 | Maryyanek et al. | 96/133 X |
| 4,994,185 | 2/1991 | Cullen et al. | 210/282 |
| 5,036,972 | 8/1991 | Cullen et al. | 96/108 X |
| 5,177,982 | 1/1993 | Plemens | 62/503 |
| 5,569,316 | 10/1996 | Flaugher et al. | 96/135 |
| 5,580,451 | 12/1996 | Tack | 96/108 X |
| 5,636,525 | 6/1997 | Riemenschneider | 62/474 |
| 5,718,743 | 2/1998 | Donnelly et al. | 96/135 |
| 5,802,868 | 9/1998 | Riemenschneider | 96/147 X |
| 5,814,136 | 9/1998 | Wood | 96/147 |
| 5,827,359 | 10/1998 | Dobson et al. | 96/147 |
| 5,837,039 | 11/1998 | LeConey et al. | 96/121 |
| 5,865,998 | 2/1999 | Abraham et al. | 96/133 X |

*Primary Examiner*—Robert Spitzer
*Attorney, Agent, or Firm*—Biebel & French

[57] ABSTRACT

An adsorbent package is provided for mounting to a filter or bleed nipple that is, in turn, attached to a bight tube or other fluid flow conduit in an auto or truck accumulator or receiver dryer. In a preferred form of the invention, a centrally disposed opening is provided in the adsorbent package and is surrounded by a rigid collar. The aperture is dimensioned so that it will be force or snap fit over a flange or the like on a filter.

16 Claims, 5 Drawing Sheets

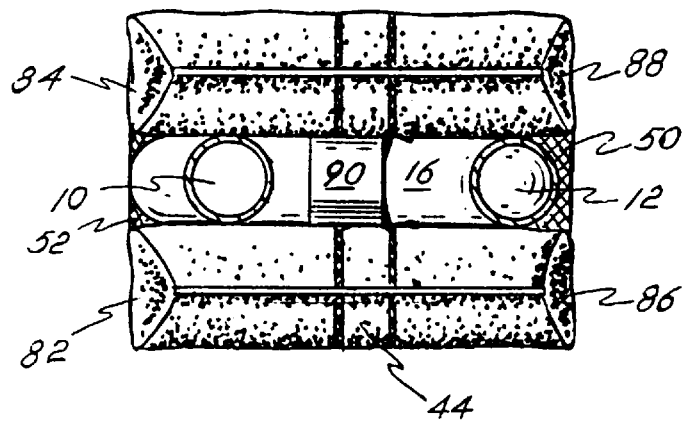
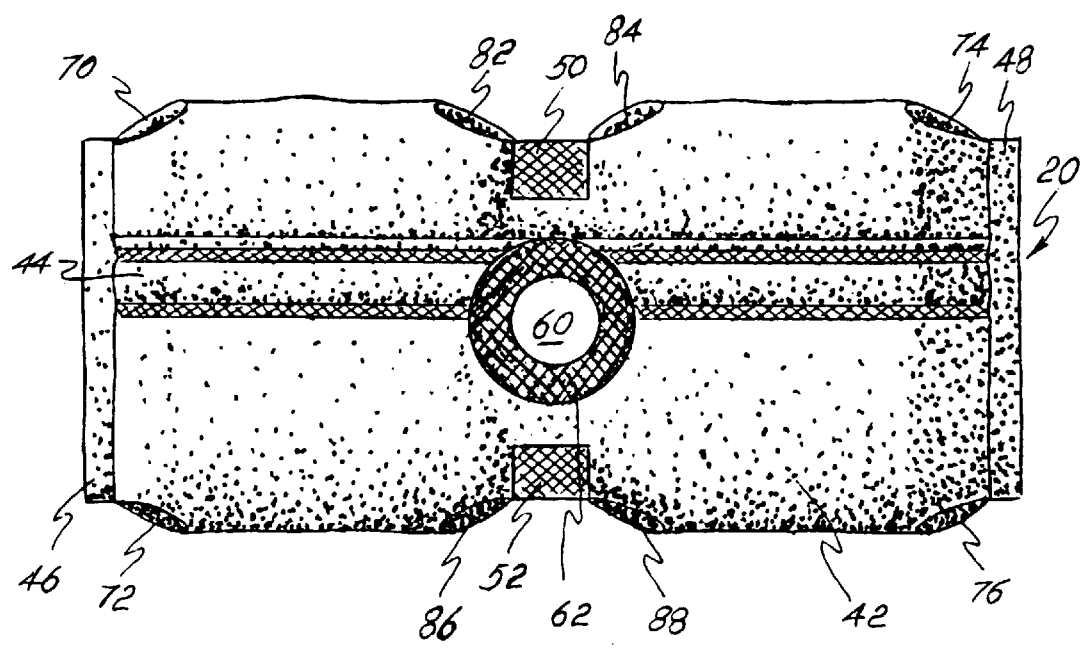

SNAP ON DESICCANT BAG

PRIOR PROVISIONAL APPLICATION

Applicant claims the benefit of the filing date of Provisional Application Ser. No. 60/069,630, filed Dec. 15, 1997.

CROSS REFERENCE TO OTHER RELATED APPLICATIONS

This application is a continuation in part application of Ser. No. 08/956,217, filed Oct. 22, 1997, now U.S. Pat. No. 5,914,456, which, in turn, is a continuation of application Ser. No. 08/633,434, filed Apr. 17, 1996, now U.S. Pat. No. 5,837,039.

FIELD OF THE INVENTION

The present application pertains to an adsorbent package adapted for use in air conditioning accumulators and receiver dryers of the type having a fluid flow line disclosed therein that is connected to a filter or bleed nipple.

BACKGROUND OF THE INVENTION

Adsorbent packages are typically provided in automotive accumulators and receivers to dehydrate air and refrigerants. Commonly, liquid accumulators for air conditioning systems, such as automotive air conditioning systems, employ a sealed or closed canister which provides temporary storage for the refrigerant and the lubricating oil, and also provides for dehydration of the refrigerant. Typically, the liquid accumulator has a permanently sealed casing which includes a baffle which separates the liquid from the gas component, and also has a generally unshaped pick up tube or suction tube with a bight portion which has a filtered bleed opening facing the container bottom. The tube also has two legs which extend upwardly toward the baffle at the top in generally, but not necessarily, parallel relationship, one end of which is open to receive an inflow of vaporized refrigerant for delivery to the suction side of the compressor by downward flow past the bottom pick up opening.

One or more desiccant packages are normally carried on or mounted on this u-shaped tube with portions extending from the filtered pick up opening upwardly along the generally parallel portions of the tube extending from the bight. The desiccant package is inserted and sealed within the accumulator prior to its permanent assembly. Accumulators of this general kind are shown in the U.S. patents of Livesay, 4,291,548 of Sep. 29, 1981, and Kisch 4,496,378 of Jan. 29, 1985. In some cases, the adsorbent package is mounted directly to the filter.

There is a need in the art to provide a stable mounting of the adsorbent package so that it will not become misaligned or dislodged during use. Such actions could block the filter or result in positioning of the adsorbent packet in the sump area of the accumulator.

In many current accumulator structures, the filter is provided as part of a plastic snap on assembly wherein a mounting ring or clasp grasps the fluid flow tube to provide a mount for the filter. Due to excessive vibration during use, abrasion of the normally fibrous pouch along this ring or clasping mechanism could result in tearing or complete rupture of the package, spilling the contents of the package into the accumulator sump area.

Also worth mentioning is the need for the provision of a nesting area that extends along the adsorbent package in generally parallel relation to the bight tube of the accumulator. This nesting area helps to ensure stable mount of the adsorbent package in the accumulator.

SUMMARY OF THE INVENTION

The above noted concerns and needs are addressed by the single, unitary adsorbent package in accordance with the invention. Briefly, the adsorbent material package of the present invention comprises a sole elongated pouch like material adapted for filling with desiccant or other adsorbent medium therein. A centrally located aperture is provided in the package and is surrounded by an annularly shaped rigid zone defining a heat or ultrasonic seal of the top surface of the package with the bottom package surface to thereby form a rigid mounting zone. The package opening is force or snap fit over a flange or the like associated with the bleed filter that is in turn connected to the bight tube of the accumulator. In normal accumulator structures, the bight tube is oriented transversely with regard to the longitudinal axis of the cylindrical housing and connects upwardly extending fluid flow tubes.

A longitudinally disposed seam member is formed along the length of the top or bottom side of the adsorbent pouch. This seam includes a double fabric layer area and may be formed via conventional means such as heat sealing, ultrasonic sealing, or other electronic sealing or fusing means. This longitudinally extending zone provides a reinforced area of the pouch that is adapted for positioning adjacent a ring like mounting clamp or the like which latter structure is commonly used to detachably mount a plastic filter to the bight tube portion.

In another aspect of the invention, a pair of rigid shoulder members is formed in the unitary pouch. Each of the shoulder members extends from one of the width wise ends of the pouch towards the central opening. These rigid shoulders are generally flat and, together with the centrally disposed opening and its surrounding flat rigid member, define a nesting surface extending transversely across the length of the pouch. This nesting surface is adapted for reception of the bight tube therein.

Preliminary indications find that it is best to provide an aperture diameter in the package of from about 0.8–0.9 based upon the outside diameter of the filter flange.

The invention will be further described and illustrated in conjunction with the following detailed description and appended drawings.

BRIEF DESCRIPTION OF THE DRAWINGS

FIG. 2 is a cross-sectional view of the accumulator and adsorbent material package and accumulator fluid flow conduits taken along the plane represented by the lines and arrows 2—2 of FIG. 1;

FIG. 3 is a bottom plan view of an adsorbent material package in accordance with the invention;

DETAILED DESCRIPTION OF THE PREFERRED EMBODIMENT

Figure 1:
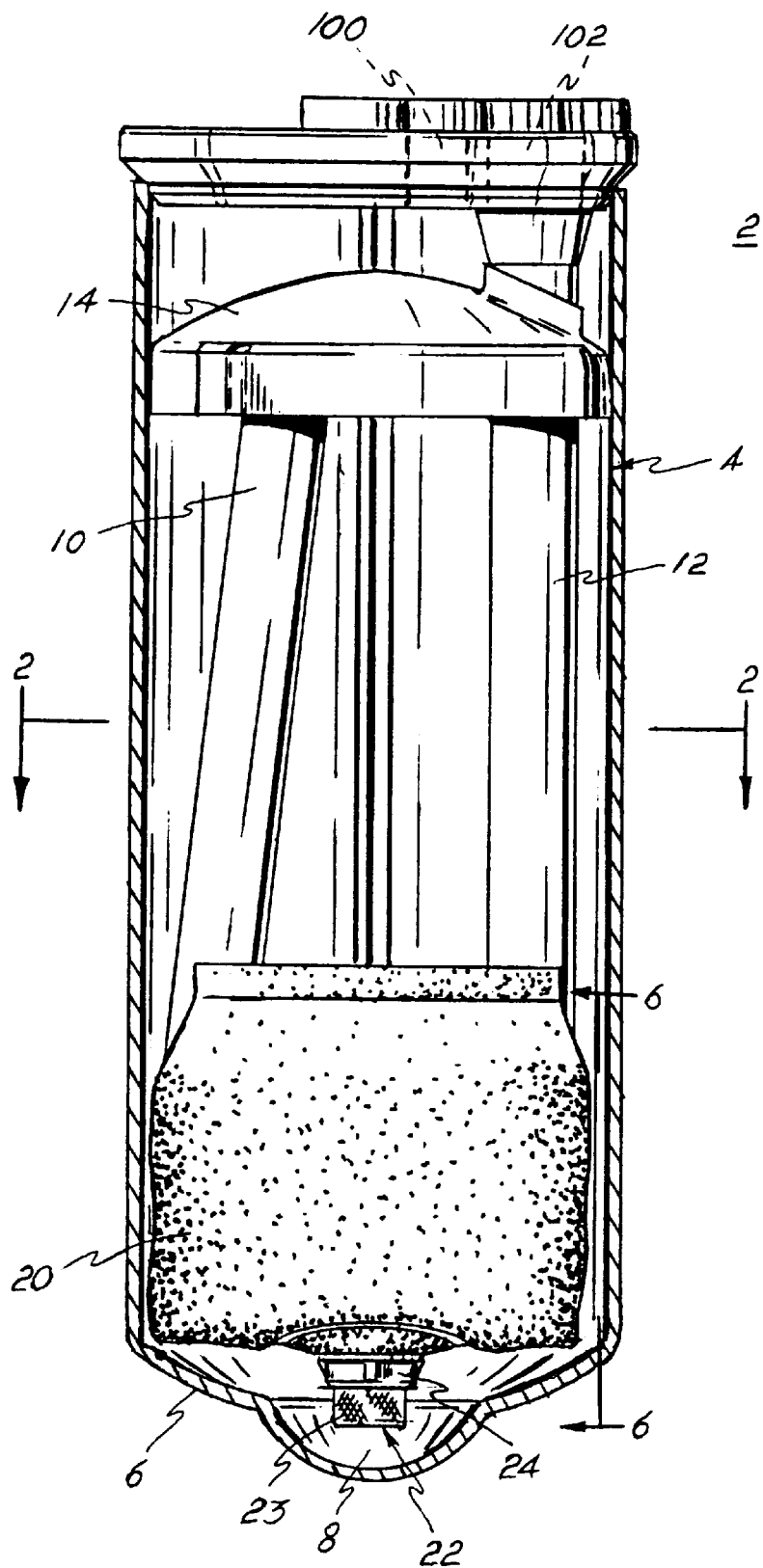
FIG. 1 is a cut away view of an accumulator incorporating a unitary adsorbent material package in accordance with the invention.

Turning first to FIG. 1 of the application, there is shown an accumulator 2 of the general type shown and described in U.S. Pat. No. 4,474,035; the disclosure of which is incorporated by reference herein. The accumulator comprises a generally cylindrical housing 4 having a bottom wall 6 leading to a sump area 8. Upstanding fluid flow tubes 10, 12 are provided in the accumulator. A baffle 14 shields direct entry to fluid flow tube 10 as set forth in the aforementioned —035 patent. The fluid flow tubes 10, 12, are connected via a transversely oriented bight tube 16 (see FIGS. 2 and 6).

As per typical operation, inlet bore 100 is in communication with the outlet conduit from an evaporator or the like, with the outlet bore 102 and communicating fluid flow conduit 12 communicating with the suction or inlet side of a compressor unit.

As shown, a sole adsorbent packet 20 is provided toward the bottom of the accumulator, but does not extend into the sump area. In accordance with normal operation, the adsorbent package comprises desiccant or the like material therein that is adapted to dehydrate the fluid medium flowing through the accumulator. Also, a small amount of lubricating oil or the like injected into the system is aspirated into the suction side of the compressor through a filter housing 22 depending from the bight tube 16. The filter comprises a filter medium 23 and support flange 24.

Figure 4:
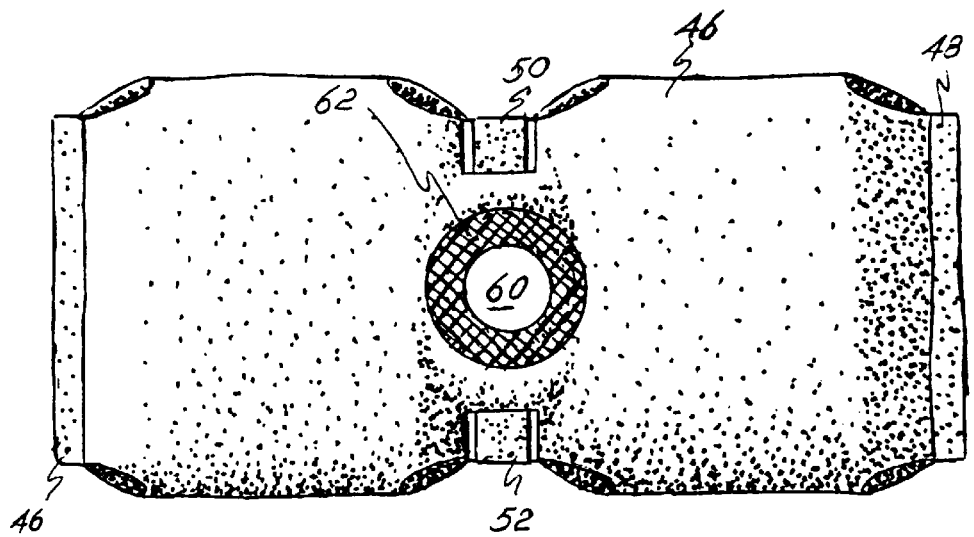
FIG. 4 is a top plan view of the adsorbent material package shown in FIG. 3.

Turning now to FIGS. 3 and 4 there is shown an adsorbent packet 20 in accordance with the invention. First, looking at FIG. 3 specifically, the back side or surface 42 of the packet is shown. Here, the elongated packet material comprises end seams 46, 48, sealing the respective longitudinal ends of the package. A longitudinally extending seam 44 extends longitudinally along the length of the elongated packet and slightly laterally offset from a longitudinally extending bisector line extending through the package. This seam 44 provides a double thickness of the felt like material used to form the packet 20 and therefore can be referred to as a reinforcement area. A circularly cross-sectioned aperture 60 is formed in the middle of the packet and is provided with a rigid heat or ultrasonically fused zone 62 surrounding the aperture. Shoulder members 50, 52 are laterally offset from the aperture 60 and provide rigid, flat surfaces which help aid in the stability of the mounting of the packet to the accumulator tube assembly as will be hereinafter explained in greater detail. The shoulders are defined by fused top and bottom surfaces of the packet. Tuck or fold sections 70, 82, 84 and 74 are disposed along the first widthwise edge of the pouch with tuck or folds 72, 86, 88, 76 provided in the opposing or second widthwise edge to define the pouch.

Although a generally circular aperture is shown in the drawings, the aperture may comprise any one of a myriad of possible cross sectional shapes such as a rectangle, triangle, parallelogram, rhombus, etc. The key criteria is that the aperture should snap or friction fit over the filter flank.

FIG. 4 depicts the top side or surface 64 of the packet 20. Here, aperture 60 is provided with rigid surrounding zone 62. Zone 62 provides a shoulder which will be snap mounted to the filter support flange 24.

Figure 6:
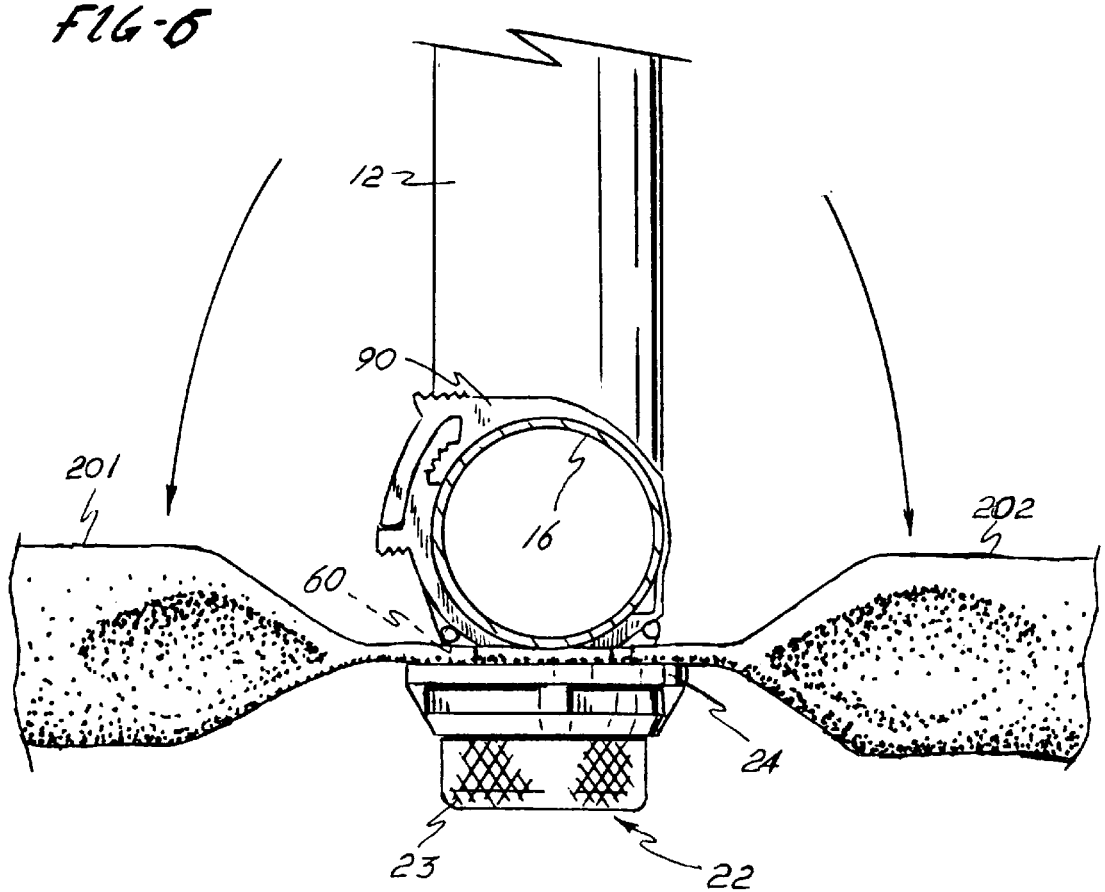
FIG. 6 is a magnified cut away view of the section of the assembly taken along the plane represented by the lines and arrows 6—6 of FIG. 1 with the exception that the lateral ends of the package have been moved downwardly as shown by the arrows to better illustrate the mounting of the adsorbent packet over the filter flange.
Figure 5:
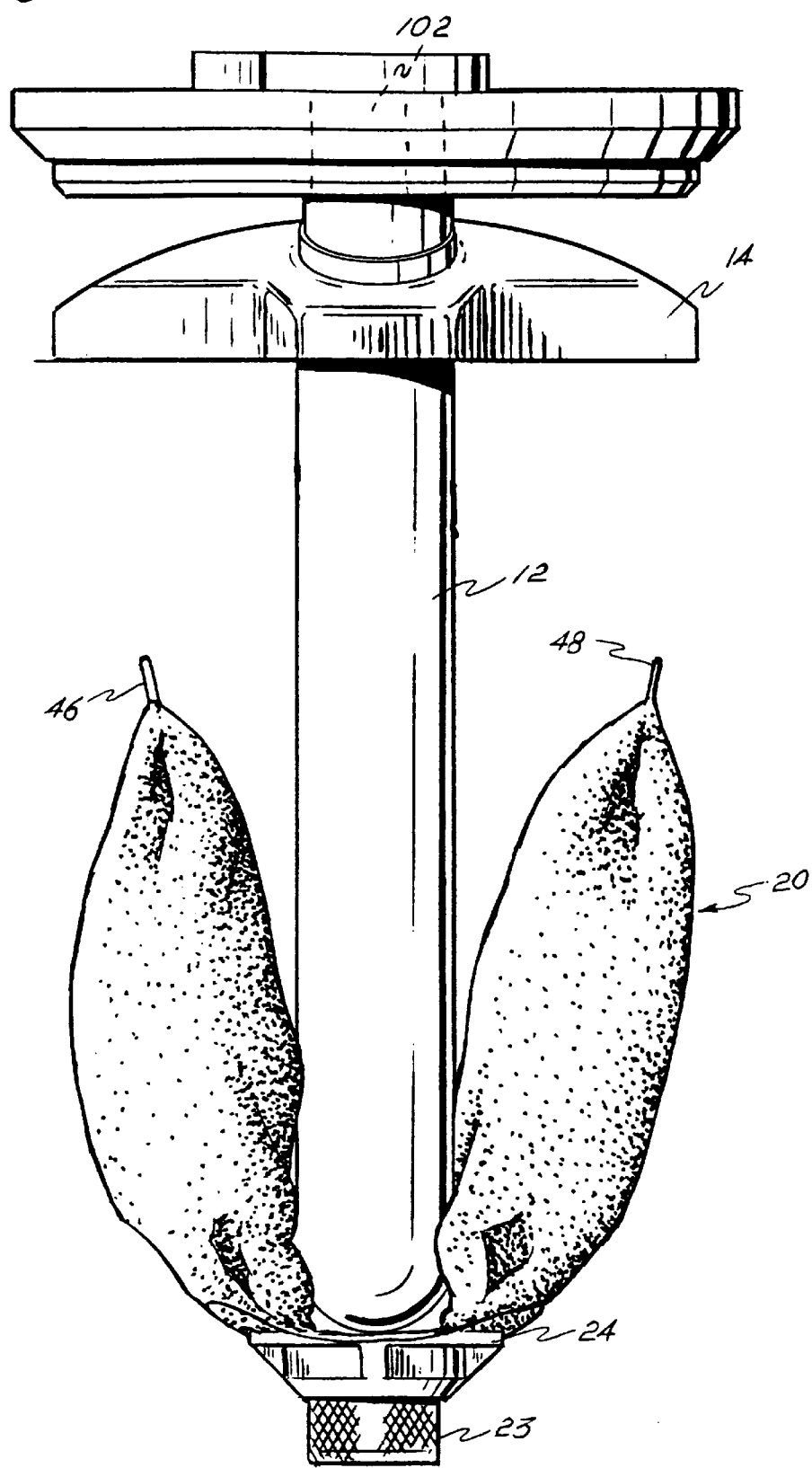
FIG. 5 is another cut away view of the accumulator and adsorbent package shown in FIG. 1 rotated 90° from the position shown in that figure with the accumulator housing omitted for better clarity.

The packet is formed from a fibrous, air permeable material such as a synthetic felt material. Polyester felts are presently preferred but other synthetic and natural felts can of course be employed. Turning now to FIGS. 5 and 6, there is shown bight tube 16 with filter housing 22 depending therefrom. The filter is clasped to the bight tube by means of the mounting ring 90 and associated clasp. The aperture 60 is firmly, frictionally received over the support flange 24 of the filter. The opposed lateral sides 201, 202 of the unitary packet will be moved upwardly, against the direction of the arrows (shown in FIG. 6), for proper insertion into the accumulator housing.

The pair of shoulders 50, 52 (see also FIG. 2) along with the rigid collar 62 surrounding the aperture, comprise a centrally located zone that extends transversely across the length of the packet. This zone provides a rigid, generally flat mounting area for congruent mounting of the bight tube portion therein. This helps provide stability for the adsorbent package during strenuous use conditions commonly encountered. Additionally, and as can be seen best in FIG. 2, the longitudinal seam 44 is parallel and adjacent to the mounting ring 90 of the filter assembly. Due to the rigid nature of the longitudinal seam, this helps to provide increased abrasion resistance of the felt packet in a location in which the ring may tend to shear or rub the packet.

It is therefore apparent that in accordance with the invention, an opening is provided in the unitary package that is snap fit over the filter housing. The opening is surrounded by an annularly shaped rigid zone so as to help maintain stability of the packet over the filter flange. Presently, the diameter of the package aperture 60 is formed so that it is about 0.8–0.9 of the diameter of the flange. One successfully employed package has provided an aperture 60 diameter of about 0.85–0.86 of the flange outside diameter dimension.

In order to make the packet 20 of the present invention, a tubular felted material, as previously described is first provided. The bottom of the pouch like material is then sealed via heat seal, or other electronically sealing system, with ultrasound sealing being preferred. Then, one half of the desired desiccant is filled into the pouch. Appropriate tucks are made in the pouch by holding the desired pouch portions in place by elongated fingers or the like and ultrasonic sealing of the area. The shoulder members and solid rigid zone 62 are then formed via ultrasonic sealing with the second half of the pouch then being filled with desiccant. The top longitudinal edge of the pouch is then sealed so as to provide a sealed packet. At the same time the bottom half of the next succeeding bag in the production run is sealed and the procedure repeated so that successive bags can be made. After each bag is cut, the central aperture 60 is cut in the middle of the zone 62.

Figure 7:
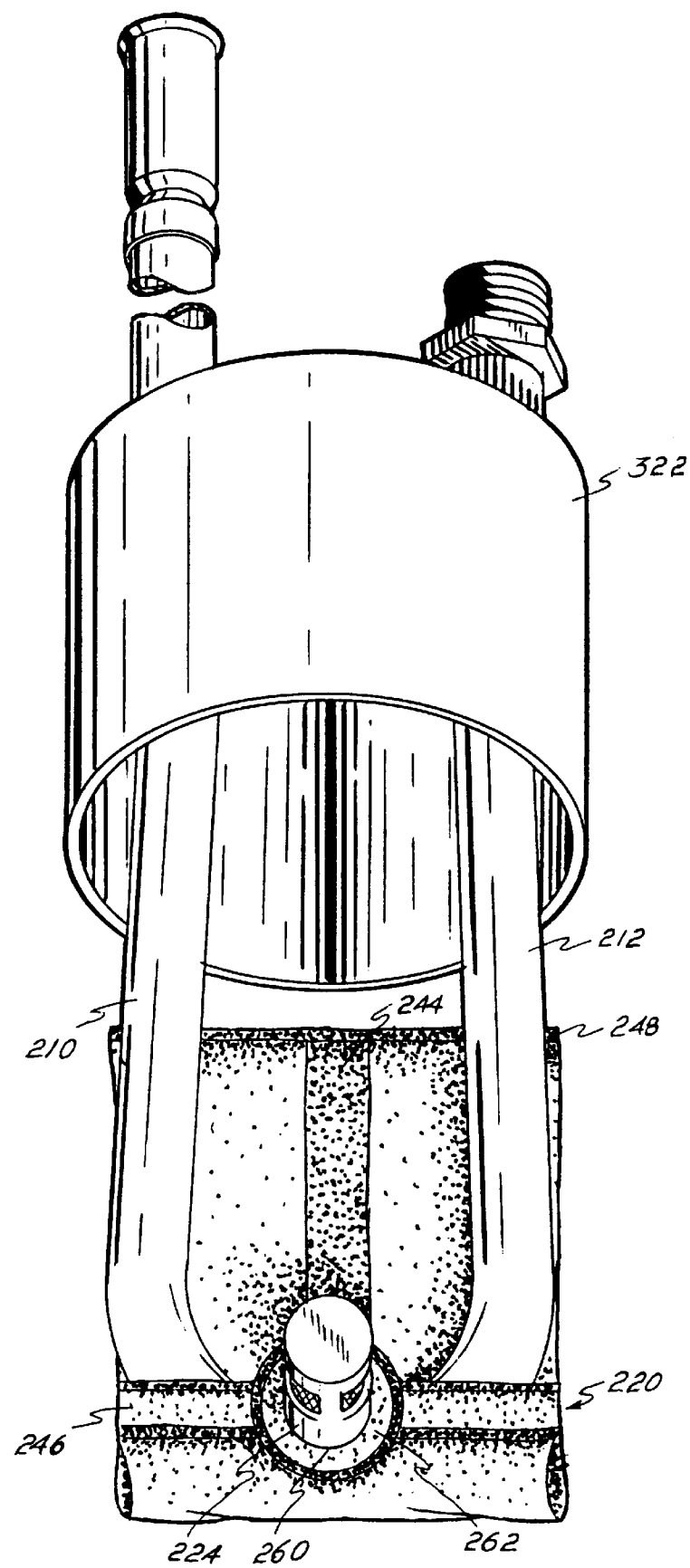
FIG. 7 is a cut away view of an accumulator top incorporating another embodiment of an adsorbent material package in accordance with the invention.

FIG. 7 shows another version of the invention wherein a smaller packet 220 is shown for those cases in which only about 40–50 grams of desiccant is needed. In this figure, the top half 322 of the accumulator housing is shown. This half will be welded or otherwise sealed to a bottom assembly to form the general accumulator housing structure shown in FIG. 1.

Similar to FIG. 1, fluid tubes 210, 212 are connected via a transversely oriented bight section with an aspirator filter housing secured to the bight tube via a ring shaped clasp (not shown). The packet 220 comprises end seams 246, 248 and an aperture 260 provided along one of the longitudinal packet end regions.

The aperture 260 is surrounded by a rigid collar 262 to facilitate snap mount of the packet over the filter flange 224. Similar to the previously described embodiment, a longitudinally extending seam 244 provides a reinforced area that is adapted for positioning adjacent the mounting clasp used to affix the filter to the fluid flow tube.

The provision of a single packet for reception of desiccant therein not only reduces the number of seams and therefore potential rupture sites, but also leads to decreased production time. Additionally due to elimination of connecting seams between bags and the attendant reduced volume areas adjacent these seams, it is possible to place more adsorbent per unit packet length into the single bags in accordance with the invention, thereby shortening the bag's overall length which aids the process of assembling and welding the accumulator can.

While the forms of apparatus herein described constitute specific embodiments of this invention, it is to be understood that the invention is not limited to these particular embodiments, and that changes may be made therein without departing from the scope of the invention which is defined in the appended claims.

What is claimed is:

1. An adsorbent package for use in a canister having a tube disposed therein and a filter housing protruding from said tube, said package comprising an opening therein snap fit over said filter housing.

2. Package as recited in claim 1 wherein said opening is surrounded by an annularly shaped rigid zone.

3. In a liquid accumulator housed within a generally cylindrical housing and having a pair of parallel spaced, upstanding fluid flow tubes therein connected by a bight portion and a filter housing connected to said bight portion wherein said filter housing includes a filter medium and a mounting flange, said mounting flange positioned intermediate said bight portion and said filter medium;

a unitary adsorbent package having an aperture therein adapted for fixed, snap fit over said mounting flange to thereby mount said package to said bight portion and space said package from said filter medium.

4. Adsorbent package as recited in claim 3 wherein said package comprises an elongated pouch having a longitudinally disposed seam formed therein defining a longitudinally extending reinforced zone, said filter comprising an annular mounting clamp for attaching said filter to said bight portion, said reinforced zone adapted for positioning thereof against said mounting clamp.

5. Adsorbent package as recited in claim 4 further comprising a rigid mounting zone surrounding said opening.

6. Adsorbent package as recited in claim 4 further comprising a pair of shoulder members formed in said pouch, each said shoulder extending transversely to said longitudinally disposed seam, said opening positioned between each of said shoulder members, said shoulders adapted for positioning adjacent said bight portion.

7. Adsorbent package as recited in claim 3 wherein said mounting flange is generally circular in shape and has an outside diameter dimension, said aperture in said package having a diameter dimension that is from about 0.8 to about 0.9 of said outside diameter dimension of said flange.

8. Adsorbent package as recited in claim 7 wherein said aperture in said package has a diameter of about 0.85–0.86 of said outside diameter dimension of said flange.

9. An adsorbent containing packet adapted for positioning over a bleed filter attached to a fluid flow conduit, said packet comprising an elongated pouch having a top surface and a bottom surface, a longitudinally extending reinforcement member extending along said bottom surface, a pair of end seams sealing respective longitudinal ends of said pouch, an aperture extending through said pouch and dimensioned for snap fit engagement over said filter, and a pair of shoulder members, each of said shoulder members extending in a transverse direction with respect to said longitudinally disposed seam, said aperture located between said pair of shoulder members.

10. Packet as recited in claim 9 wherein said shoulders and said aperture are positioned at an approximate midpoint between said pair of end seams.

11. Packet as recited in claim 10 wherein each of said shoulder members comprises a rigid section of said packet.

12. Packet as recited in claim 11 wherein each said shoulder comprises a seal section sealing said top surface and said bottom surface of said packet together.

13. Packet as recited in claim 12 wherein each said shoulder comprises a flat seal section.

14. Packet as recited in claim 13 further comprising a rigid mounted section surrounding said aperture, said mounting section comprising a sealed section of said top and bottom surfaces of said packet.

15. Packet as recited in claim 14 wherein said aperture is centrally located on said packet.

16. An adsorbent containing packet adapted for positioning over a bleed filter attached to a fluid flow conduit by a ring clasp device, said packet comprising an elongated pouch having a top surface and a bottom surface, said packet comprising a longitudinally extending reinforcement member extending along said bottom surface and adapted for positioning adjacent said ring clasp device.

\* \* \* \* \*